US008660964B2

(12) United States Patent
Clark et al.

(10) Patent No.: US 8,660,964 B2
(45) Date of Patent: Feb. 25, 2014

(54) SECURE DEVICE LICENSING (75) Inventors: Charles F. Clark, Roseville, CA (US);
Joshua D. Miller, Roseville, CA (US);
Frank A. Reichstein, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2028 days.

(21) Appl. No.: 11/477,863

(22) Filed: Jun. 30, 2006

(65) Prior Publication Data
US 2008/0005033 A1    Jan. 3, 2008

(51) Int. Cl.
*G06F 17/00* (2006.01)
(52) U.S. Cl.
USPC ............... 705/59; 705/57; 705/58; 726/30
(58) Field of Classification Search
USPC ............... 705/50–59; 380/200–202; 725/1; 726/26–33
See application file for complete search history.

(56) References Cited

U.S. PATENT DOCUMENTS

| 7,299,209 | B2 * | 11/2007 | Collier | 705/59 |
| 2004/0148525 | A1 * | 7/2004 | Aida et al. | 713/201 |
| 2005/0102240 | A1 * | 5/2005 | Misra et al. | 705/59 |
| 2006/0106727 | A1 * | 5/2006 | Yellai et al. | 705/59 |
| 2008/0109396 | A1 * | 5/2008 | Kacin | 707/1 |

* cited by examiner

*Primary Examiner* — Calvin L Hewitt, II
*Assistant Examiner* — John M Winter (57) ABSTRACT

A system for generating a transferable license key and method thereof are described. The system comprises a license key generator for generating a transferable license key responsive to receipt of a license key request. The license key request comprises a hardware identifier and the transferable license key comprises an uninstall key. The system further comprises a storage device arranged to store the hardware identifier and the uninstall key. The method comprises storing a generated hardware identifier in a first device and transmitting a license key request to a second device, wherein the license key request comprises the hardware identifier. A feature of the first device is activated based on a license key received from the second device. The license key received at the first device is stored and the license key comprises a license identifier and an uninstall verification portion from the second device.

11 Claims, 9 Drawing Sheets

SECURE DEVICE LICENSING

BACKGROUND

One approach to securely licensing a device relies on encoding data in different parts of a license key. If the scheme is uncovered, the license key could be generated by others including unlicensed individuals.

Another approach is to require users to register their products online with a license key included with the product. Product software then performs a network-based check to determine if the product is licensed. A user of the product needs to maintain or establish a network connection on a recurring basis in order to allow license determination of the product. Further, the value of the license cannot be recovered once used for a particular product as no way to prove that the license was removed exists.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
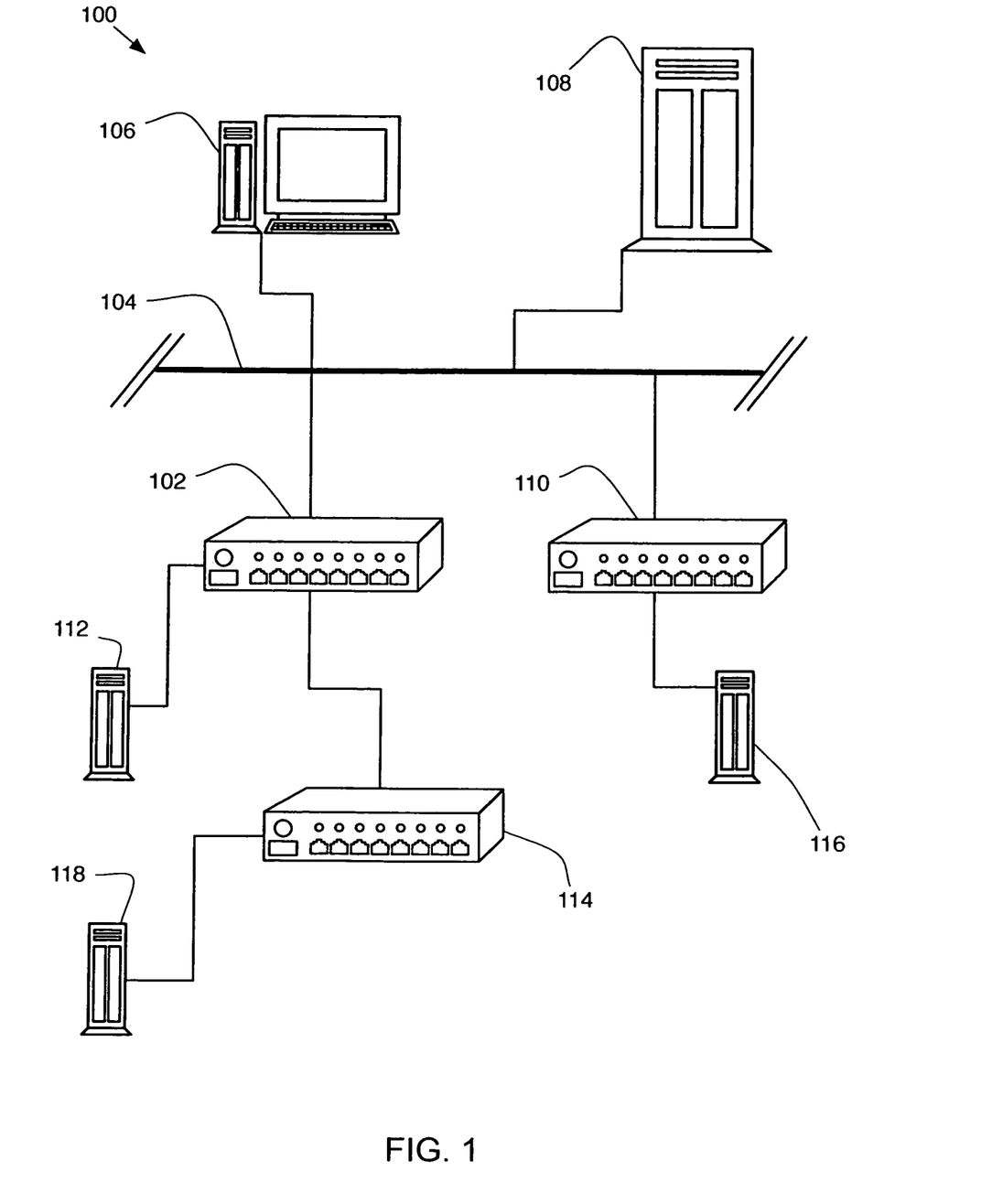
FIG. 1 is a high level diagram of an interconnected network of devices usable in conjunction with an embodiment.

FIG. 1 depicts an interconnected network of devices (generally referenced by reference numeral 100) comprising a network switch 102 connected via a network 104 to a computer system 106 and a server 108. The term network switch generally comprises a device comprising a processor and/or a logic device for enabling communication between connected network segments. The terms computer system and server generally comprise processing devices such as a desktop, laptop, palmtop, handheld, or other computer system, as appropriate. A user manipulating computer system 106 interacts with network switch 102 and portal server 108, as described below, in order to install and uninstall one or more licenses on the network switch in accordance with one or more embodiments. For convenience and ease of reference, computer system 106 is referred to herein as user computer system and/or user system and server 108 is referred to herein as portal server and/or portal.

Device network 100 also comprises a second network switch 110 connected to network 104 to which, according to some embodiments, the user manipulating user system 106 transfers a license previously uninstalled from network switch 102. That is, the user is able to install a transferable license in network switch 102 and subsequently uninstall and transfer the transferable license from the network switch to second network switch 110 for installation on the second network switch. Portal server 108 generates the transferable license and subsequently verifies the uninstallation of the transferable license from network switch 102. Further, portal server 108 enables the subsequent installation of the uninstalled transferable license on second network switch 110.

With respect to FIG. 1, device network 100 further comprises a computer system 112 and a third network switch 114 connected to network switch 102 and a computer system 116 connected to second network switch 110. A computer system 118 connects with third network switch 114. Network switch 102 may be a network-connected and/or network-connectable device as described below.

Figure 2:
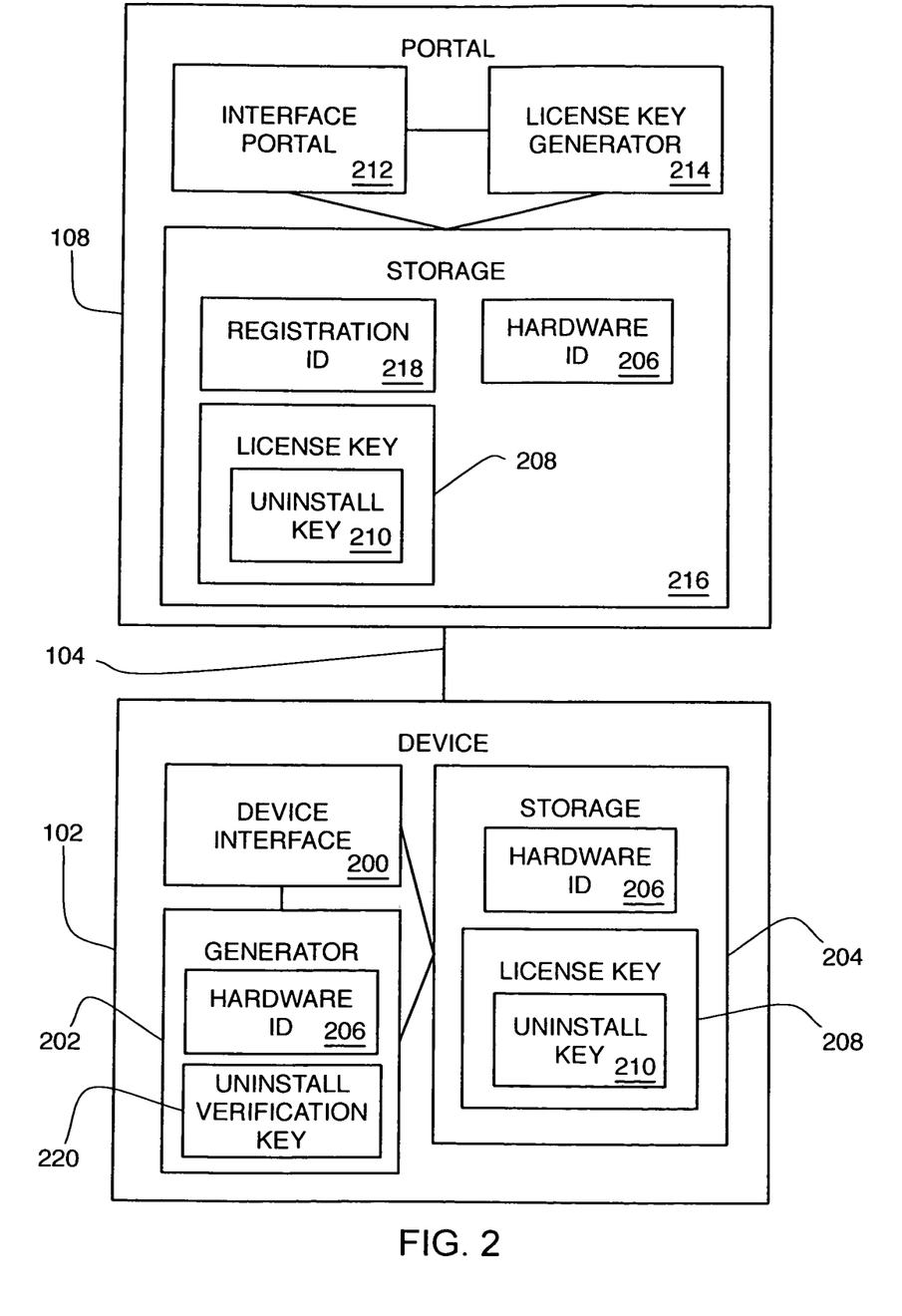
FIG. 2 is a high level block diagram of portal server of FIG. 1 connected with a network switch of FIG. 1 according to an embodiment.

FIG. 2 depicts a high level block diagram of a network-connected device, e.g., network switch 102, connected via network 104 with portal 108. Device 102 comprises a device interface 200 to enable interaction with the device by a user at user system 106, a generator 202, and a storage device 204, e.g., a memory, disk drive, or other fixed and/or removable storage mechanism. Storage device 204 comprises one or more memory locations accessible by device 102 to read and write information including a hardware identifier (ID) 206 and a license key 208. License key 208 comprises an uninstall key 210 received from portal 108 and described in further detail below. Generator 202 generates hardware ID 206 containing information specific to device 102, e.g., in some embodiments the hardware ID uniquely identifies device 102.

Portal 108 comprises an interface portal 212 to enable interaction with the portal by a user at user system 106, a license key generator 214, and a storage device 216 similar to storage device 204 described above. Interface portal 212 may be a web site or other mechanism, e.g., a server-executed application to which a user may connect via network 104. Storage device 216 comprises one or more memory locations accessible by portal 108 to read and write information including hardware ID 206, license key 208, and a registration ID 218 received from user system 106.

Registration ID 218 comprises an encrypted and/or encoded form of a license for one or more software licenses for a particular group of features on a specific device. Registration ID 218 may be printed and packaged as a device upgrade and/or displayed to a user at user system 106 after receipt of the registration ID, e.g., from portal server 108. In some embodiments, the user may print the displayed registration ID 218 for later reference and/or ease of use. As described in further detail below, after a user receives registration ID 218, the user uses portal 108 to redeem the registration ID for a license key 208 which will enable a group of features on device 102.

In some embodiments, portal 108 maintains a list of existing registration identifiers issued along with registration IDs which may have been used by users to obtain license keys.

In order to redeem registration ID 218, the user registers with portal 108, e.g., using portal interface 212. For example, the user may provide and/or establish a login ID and password and establish a profile at portal 108 which may comprise information regarding device 102. Further, the user may additionally provide additional information about one or more additional devices, e.g., second network switch 110 and third network switch 114, to portal 108 for later use.

In some embodiments, license key 208 enables features on a single device 102 after installation on the device. That is, in such instances, license key 208 is usable on a single device, e.g., network switch 102 and not second network switch 110 or third network switch 114. In order to bind license key 208 to device 102 in a one-to-one fashion, generator 202 generates hardware ID 206 and communicates the hardware ID to the user for transmission to portal 108 in order to obtain license key 208.

After receipt of hardware ID 206 and registration ID 218, portal 108, i.e., license key generator 214, generates and transmits the license key 208 to user system 106 for use by the user. Then, the user installs the license key 208 on device 102 causing the particular feature set of the device specified by the license key to be enabled, i.e., a group of features of the device are enabled.

After installation of license key 208 on device 102, the user may desire to uninstall the license from the device, e.g., the user may be decommissioning the device, the user may wish to transfer the license to another device such as second network switch 110, etc. In order to uninstall the license from device 102, the user causes the device to perform an uninstall process and obtains an uninstall verification key 220 from the device. Device 102 generates uninstall verification key 220 using uninstall key 210 stored in storage device 204. In some embodiments, device 102 encrypts a combination of a device serial number checksum 404 (FIG. 4), a platform ID 406 (FIG. 4), a feature group 502 (FIG. 5), an optional provisional flag 308 (FIG. 3), an optional feature group specific data 310 (FIG. 3), uninstall key 210, and a validation data 602 (FIG. 6) using the device serial number checksum 404 (FIG. 4), the platform ID 406 (FIG. 4), the feature group 502 (FIG. 5), the optional provisional flag 308 (FIG. 3), the feature group specific data 310 (FIG. 3), uninstall key 210, and a validation data 510 (FIG. 5) as the encryption key to form an encrypted portion 600 of uninstall verification key 220. In some further embodiments, encrypted portion 600 is further encoded, e.g., using a base-24 encoding scheme. Device 102 combines device serial number 400 with encrypted portion 600 to form uninstall verification key 220.

Device 102 also generates, i.e., using generator 202, a new hardware ID 206 and replaces the previous hardware ID 206 stored in storage device 204 with the newly generated hardware ID in order to prevent the user from reusing the previously installed license key 208. In some embodiments, device 102 uses uninstall key 210 as an encryption key to generate uninstall verification key 220. In some further embodiments, feature group 502 may be used to communicate information about device 102 to portal 108, e.g., usability information, and other device-specific information.

After receipt of uninstall verification key 220 from device 102, the user causes user system 106 to transmit the uninstall verification key to portal 108. After receipt of uninstall verification key 220, portal 108 generates a new registration ID 218 for the user and stores the generated registration ID in storage device 216 and/or transmits the generated registration ID to the user at user system 106. At this point, the user may obtain another hardware ID 206, e.g. from second network switch 110, and request portal 108 to generate a new license key 208 for use with the second network switch to enable the same feature set as previously enabled on network switch 102. Alternatively, the user may retain registration ID 218 stored at user system 106 and/or portal 108 for use at a later time.

Figure 3:
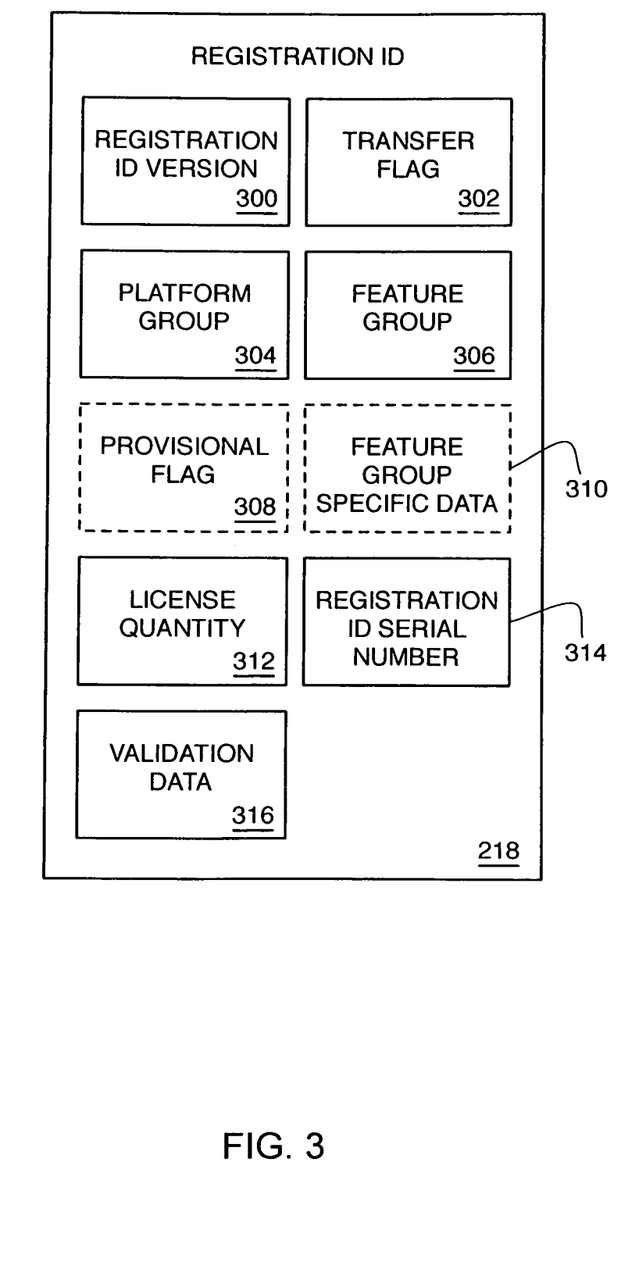
FIG. 3 is a high level block diagram of a registration ID of FIG. 2 according to an embodiment.

Registration ID 218 is now described in detail with reference to FIG. 3. Registration ID 218 is a mechanism for describing the functionality enabled by a particular feature set of a license and the quantity of the licenses enabled. As described above, registration ID 218 is generated, e.g., by portal 108, and presented to the user for use according to an embodiment.

The user may receive registration ID 218 in the form of a printed and/or laminated card including the registration ID or other mechanism, e.g., display on a screen. In some embodiments, the information comprising registration ID 218 is encrypted using a block cipher, e.g., the advanced encryption standard (AES)-128 symmetric block cipher; however, other encryption methods may be used. Use of a block cipher allows the generation of the registration ID 218 based on a symmetric-sized plaintext input. For example, in some embodiments the collection of information used to generate registration ID 218 is 128 bits in length after concatenation of the values and the generated registration ID is 128 bits in length. Further, in some embodiments, registration ID 218 may be base-24 encoded to provide a user-readable format.

Registration ID 218 comprises a registration ID version 300 indicating the version of the format of the registration ID, a transfer flag 302, a platform group 304, a feature group 306, and optional provisional flag 308 (dashed line) and feature group specific data 310 (dashed line). Registration ID 218 also comprises a license quantity 312, a registration ID serial number 314, and a validation data 316 which indicates that decoding and/or decryption operations were successfully performed.

Transfer flag 302 indicates whether registration ID 218 was generated by portal 108 as a result of the transfer of a license from one device to another, e.g., from network switch 102 to second network switch 110. In some embodiments, transfer flag 302 may be an optional portion of registration ID 218.

Platform group 304 indicates the target device, e.g., network switch, for which the licenses described in registration ID 218 are defined. Each device, e.g., network switch 102, second network switch 110, etc., has an assigned platform identifier identifying the group to which the device belongs. Platform group 304 may identify a single platform identifier or a set of platform identifiers if the license is applicable to more than one platform.

Feature group 306 indicates the features to be enabled on device 102 by the particular registration ID. Feature group 306 denotes the features that are enabled by a license that is generated using a particular registration ID. In some embodiments, feature group 306 indicates whether a single license or multiple licenses may be installed on device 102.

Optional provisional flag 308 indicates whether the license (s) described in registration ID 218 is/are provisional in nature. Optional feature group specific data 310 indicates, dependent upon the value of feature group 306, specific values for features specified in the feature group.

License quantity 312 indicates the total number of licenses comprising registration ID 218. Portal 108 uses license quantity 312 to limit the total number of outstanding licenses obtained using registration ID 218. Registration ID serial number 314 distinguishes a particular registration ID 218 from other registration IDs. In some embodiments, registration ID serial number 314 is unique among registration IDs.

Figure 4:
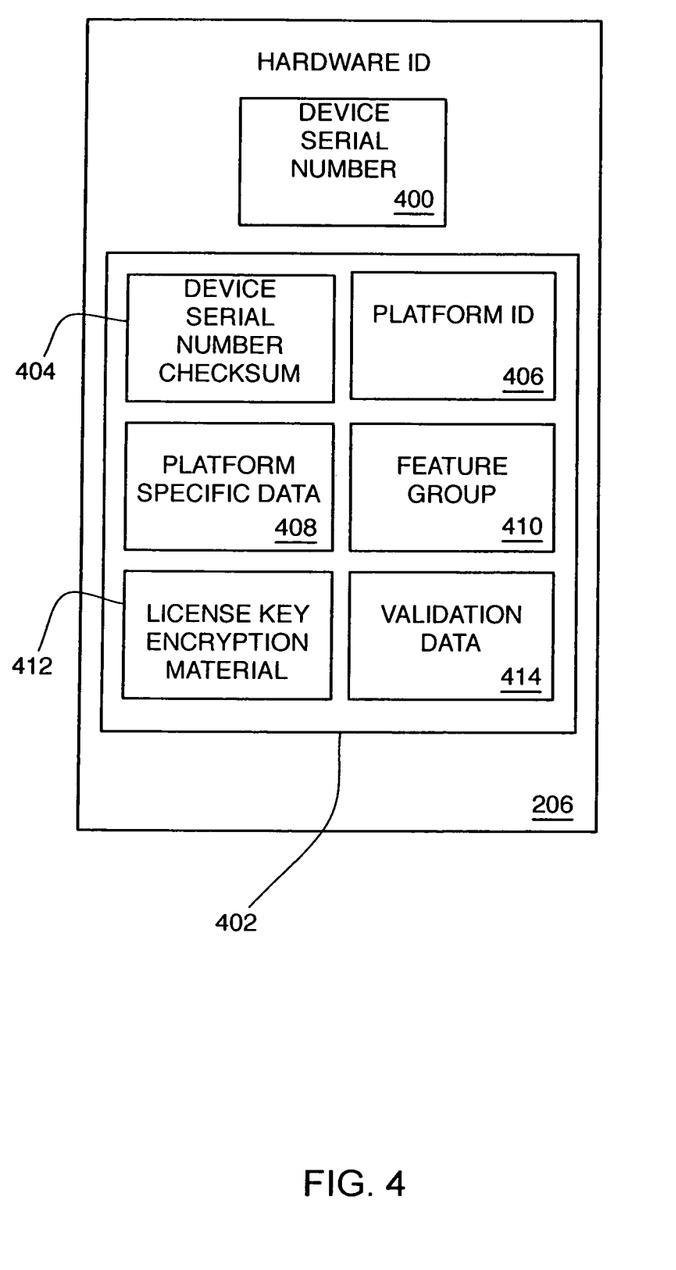
FIG. 4 is a high level block diagram of a hardware ID of FIG. 2 according to an embodiment.

Hardware ID 206 is now described in detail with reference to FIG. 4. Hardware ID 206 is a mechanism for describing the target device, e.g., network switch 102, on which the user desires to install a license to enable a particular feature or set of features and for describing the desired feature or set of features. As described above, hardware ID 206 is generated by device 102, stored in storage device 204, and presented to the user for use according to an embodiment in order to obtain license key 208 from portal 108. Hardware ID comprises device serial number 400 and an encrypted portion 402 encrypted using a block cipher, as described above. Similarly, encrypted portion 402 may be base-24 encoded to provide a user-readable format.

Encrypted portion 402 of hardware ID 206 comprises a device serial number checksum 404, a platform identifier 406, platform specific data 408, a feature group 410, license key encryption material 412, and validation data 414 which indicates that decoding and/or decryption operations were successfully performed.

Device serial number checksum 404 is a checksum of device serial number 400. Platform identifier 406 indicates the type of device 102. Platform specific data 408 indicates platform-dependent data, e.g., an identifier of the software revision of the currently installed software on device 102. Feature group 410, similar to feature group 306 described above, indicates the features or feature set which the user desires to install and/or enable on device 102. Device 102 supports a specific set of licensable features and/or sets of features and the user chooses from the device's licensable feature(s). The user specifies a feature and/or set of features desired to be enabled on device 102 and incorporated into hardware ID 206. For example, a user may interact with device 102 and identify that one or more feature sets are available for licensing on the device, e.g., "premium," "regular," "super." The user may then request a hardware ID 206 be generated by device 102 for the particular feature set.

License key encryption material 412 is a random value causing hardware ID 206 content to be unique. In an embodiment, license key encryption material 412 differs for each feature group and is changed for a feature group after the particular feature group license is uninstalled. In some embodiments, device 102 uses a random number generator (RNG) (not shown) to create encryption material 412. RNG may be a part of device 102 or accessible to the device. The RNG uses device 102 information including device serial number 400, a MAC address of the device, time since device boot, and additional parameters, e.g., number of packets received on the networking interfaces, etc. After a change of encryption material 412 during a license uninstall, device 102 generates new encryption material to replace the existing encryption material. In some embodiments, device 102 verifies that newly generated encryption material 412 does not match the former encryption material. In some further embodiments, depending on available space in storage 204 device 102 stores one or more copies of replaced encryption material 412 in a predetermined portion of the storage. In some further embodiments, device 102 uses a shared secret, i.e., a pre-shared value known to device 102 and portal 108, as the encryption key for encrypting hardware ID encrypted portion 402.

Figure 5:
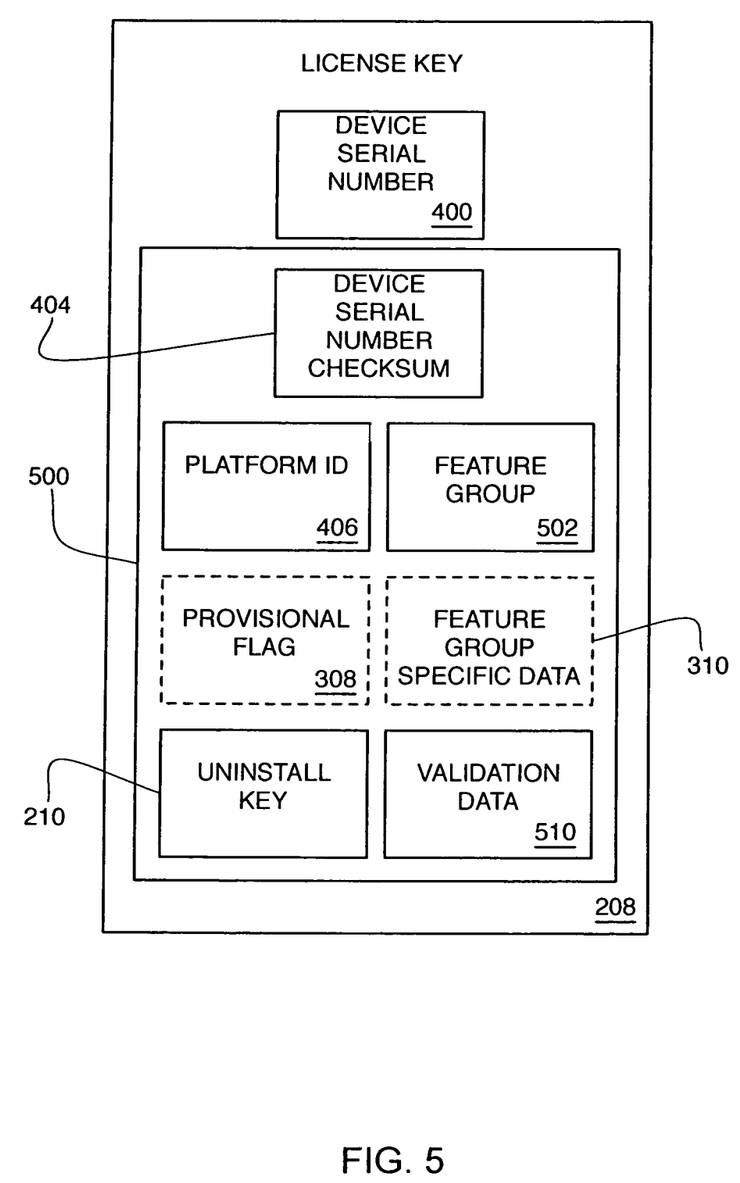
FIG. 5 is a high level block diagram of a license key of FIG. 2 according to an embodiment.

Portal 108 generates license key 208 after receiving and validating hardware ID 206. The portal-generated license key 208 comprises information specific to device 102, information specific to the feature or feature set being licensed, and another generated key, i.e., uninstall key 210, to distinguish the license key from other license keys. In some embodiments, portal 108 uses a RNG (not shown) to create uninstall key 210. RNG may be a part of portal 108 or accessible to the portal. In an embodiment, the RNG operates similar to device 102 and uses portal 108 information including a MAC address of the portal time since portal boot, and additional parameters, e.g., number of packets received on the networking interfaces, etc; however, other embodiments may be used. Portal 108 stores a copy of generated uninstall key 210 in storage 216 for later comparison with uninstall verification key 220 described below. For example, if portal 108 is able to decrypt uninstall verification key 220 using uninstall key 210, then the portal knows that device 102 was able to decrypt license key 208 in order to extract uninstall key 210 and subsequently use the uninstall key to encrypt the uninstall verification key.

In some embodiments, portal 108 encrypts a combination of device serial number checksum 404, platform ID 406, feature group 306, optional provisional flag 308, optional feature group specific data 310, uninstall key 210, and validation data 510 using device serial number checksum 404, platform ID 406, feature group 306, optional provisional flag 308, optional feature group specific data 310, license key encryption material 412, and validation data 414 to form an encrypted portion 500 of license key 208. In some further embodiments, encrypted portion 500 is further encoded, e.g., using a base-24 encoding scheme. Portal 108 combines device serial number 400 with encrypted portion 500 to form license key 208.

In some embodiments, portal 108 verifies that registration ID 218 matches an issued registration ID by comparing the received registration ID serial number 314 with the stored list of issued registration identifiers. At this point, in some embodiments, portal 108 may additionally verify that the registration ID serial number 314 has not been previously used by this or another user. In some further embodiments, portal 108 verifies the user request for a license by comparing the feature group 306 with feature group 410 to determine if the feature groups match. If the feature groups 306, 410 match and if platform ID 406 is within platform group 304, the portal generates license key 208.

After generation of license key 208, in some embodiments portal 108 encrypts a portion of the license key using a block cipher; e.g., AES-128, using hardware ID 206 as a key and base-24 encodes the resulting encrypted license key. The encrypted license key 208 is presented to the user for installation on device 102 corresponding to hardware ID 206. The user installs license key 208 on device 102 and the device decodes and/or decrypts the license key, verifies the key with respect to hardware ID 206, and enables the feature or feature set specified by the key. Device 102 verifies a license key 208 requested to be installed by the user by (1) decoding and/or decrypting the license key using hardware ID 206 stored in storage 204, and checking the validation data in the decrypted license key; (2) comparing device serial number 400 stored as part of hardware ID 206 in storage 204 with device serial number checksum 400 decoded and/or decrypted from the license key; (3) comparing device serial number 404 stored as part of hardware ID 206 in storage 204 with device serial number 404 from the license key; and (4) comparing feature group 502 from the license key with the feature group 306 stored as part of hardware ID 206 in storage 204. In some embodiments, one or more of the above comparison checks (1)-(4) may or may not be performed depending on the particular embodiment.

License key 208 is now described in detail with reference to FIG. 5. License key 208 comprises device serial number 400 and an encrypted portion 500 encrypted using a block cipher, as described above. Similarly, encrypted portion 500 may be base-24 encoded to provide a user-readable format.

Encrypted portion 500 of license key 208 comprises device serial number checksum 404, platform identifier 406, a feature group 502 (similar to feature groups 306 and 410 described above), provisional flag 308, feature group specific data 310, uninstall key 210, and validation data 510 which indicates that decoding and/or decryption operations were successfully performed. Feature group 502 indicates the feature or feature set license key 208 enables and corresponds to feature group 410 used in creating hardware ID 206. In some embodiments, if feature group 502 fails to match feature group 410, installation of license key 208 on device 102 fails.

Figure 6:
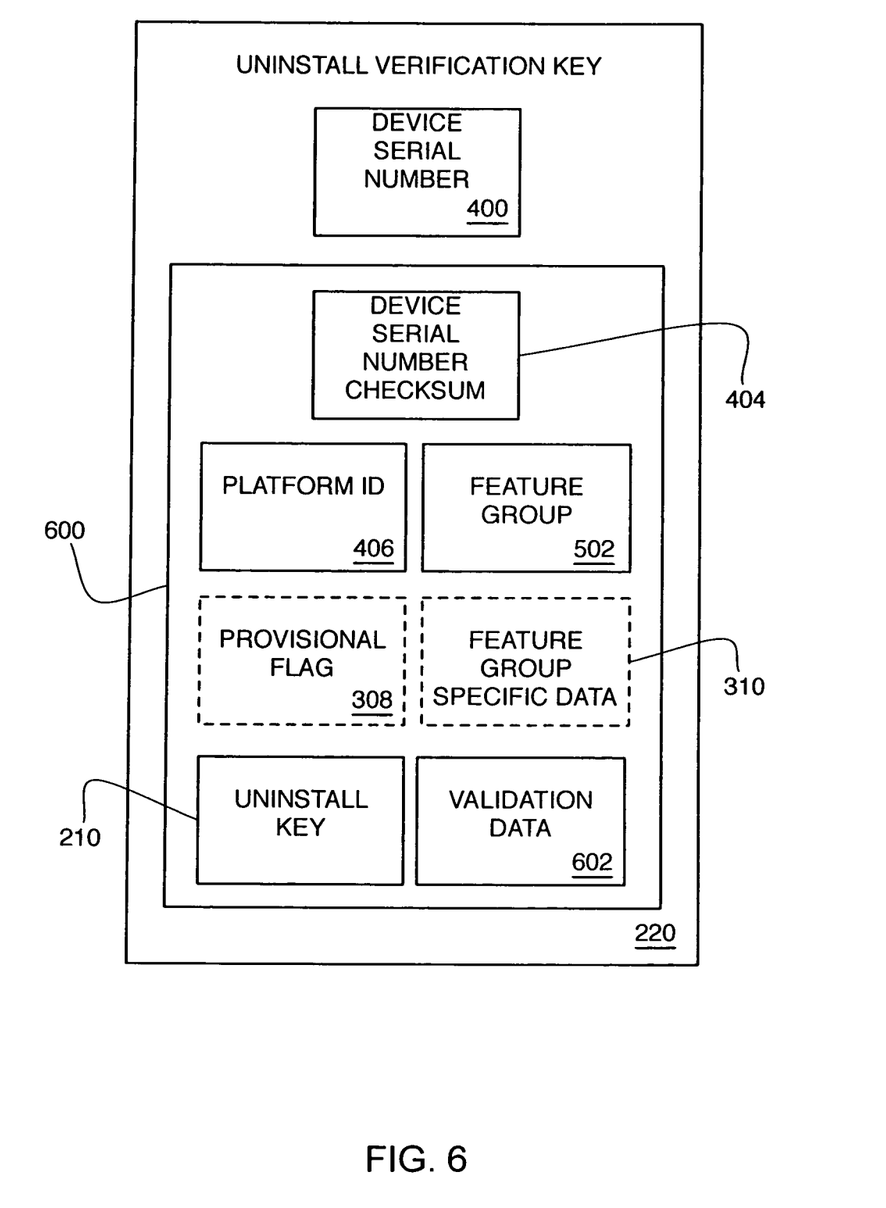
FIG. 6 is a high level block diagram of an uninstall verification key of FIG. 2 according to an embodiment.

Portal 108 generates uninstall key 210 in order to prevent or minimize the possibility of replay attacks. Device 102 comprises uninstall key 210 in uninstall verification key 220 (described below) as proof to portal 108 that device 102 successfully decrypted license key 208.

Device 102 generates uninstall verification key 220 for provision to portal 108 as proof of uninstallation of the license and the uninstall verification key is now described in detail with reference to FIG. 6. Uninstall verification key 220 is generated and presented to the user for use according to an embodiment in order to uninstall license key 208 from device 102 and return the license to portal 108. In some embodiments, by uninstalling license key 208 from device 102 and returning the license to portal 108, the user is able to subsequently transfer the uninstalled license key to a second device, e.g., second network switch 110, for installation and enablement of the feature or feature set.

Uninstall verification key 220 comprises device serial number 400 and an encrypted portion 600 encrypted using a block cipher, as described above. Specifically, in some embodiments, device 102 encrypts a combination of device serial number checksum 404, platform ID 406, feature group 306, optional provisional flag 308, optional feature group specific data 310, uninstall key 210, and validation data 602 using a decrypted version of encrypted portion 500 of license key 208 to form an encrypted portion 600 of uninstall verification key 220. In some further embodiments, encrypted portion 600 is further encoded, e.g., using a base-24 encoding scheme. Device 102 combines device serial number 400 with encrypted portion 600 to form uninstall license key 220. Similarly, encrypted portion 600 may be base-24 encoded to provide a user-readable format.

Encrypted portion 600 of uninstall verification key 220 comprises device serial number checksum 404, platform identifier 406, feature group 502, (optional) provisional flag 308, (optional) feature group specific data 310, uninstall key 210, and validation data 602.

Figure 7:
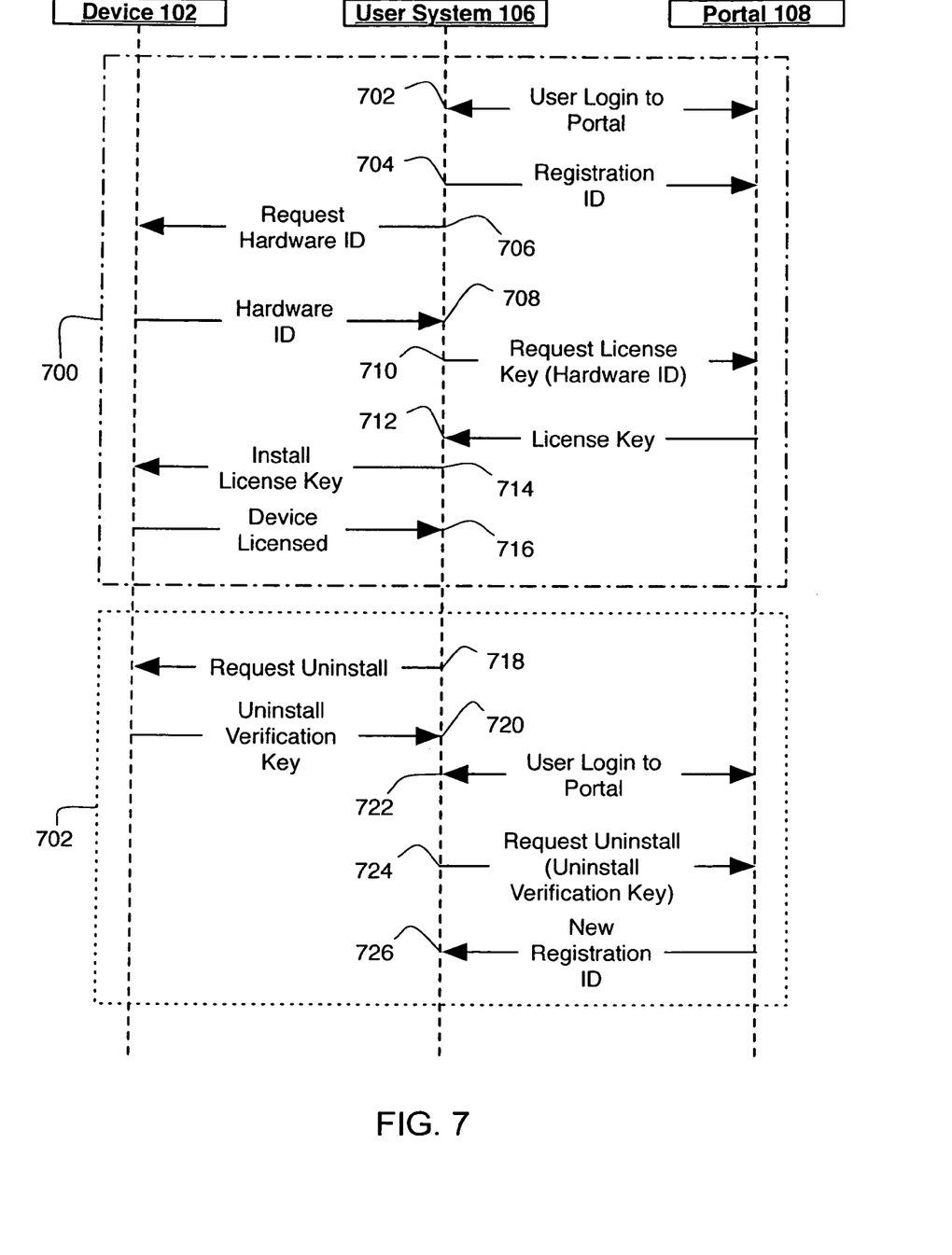
FIG. 7 is a message sequence diagram of operation of an embodiment.

FIG. 7 depicts a message sequence diagram of operation of an embodiment. Time proceeds down the page. In particular, FIG. 7 comprises an install sequence 700 and an uninstall sequence 702.

Install sequence 700 comprises a user, e.g., at user system 106, logging in to portal 108, e.g., using interface portal 212 such as a web interface, in block 702. In block 704, the user causes user system 106 to provide registration ID 218 to portal 108. Then at block 706, the user causes user system 106 to communicate with and request hardware ID 206 from device 102. Responsive to the block 706 request, device 102 provides hardware ID 206 to user system 106 (block 708).

User system 106 then requests a license key (block 710) from portal 108 and provides the received hardware ID 206 along with the request. Responsive to the block 710 request from user system 106, portal 108 verifies the provided registration ID 218, e.g., to counter registration ID reuse by a user, and generates license key 208 including uninstall key 210. Then, portal 108 provides the license key to user system 106 (block 712) which, in turn, installs the license key (block 714) on device 102. Responsive to installation of license key 208 on device 102, the device returns an indication to user system 106 of successful installation (block 716).

Uninstall sequence 702 comprises the user at user system 106 transmitting to device 102 a request to uninstall a license (block 718). Responsive to receipt of the uninstall request from user system 106, device 102 uninstalls license key 208, including generating and storing a new hardware ID 206 at the device. As described above, generation of a new hardware ID 206 at uninstallation time prevents a user from reinstalling an old license (which would be tied to the old hardware ID). Further, device 102 generates uninstall verification key 220 as described above and transmits the uninstall verification key to user system 106 (block 720).

At block 722, the user logs into portal 108, e.g., by providing a user identifier and password. The user then causes user system 106 to transmit to portal 108 a request to accept the uninstallation of the particular license key identified in uninstall verification key 220 from device 102 (block 724). The block 724 request comprises uninstall verification key 220 received from device 102. Responsive to receipt of the block 724 request, portal 108 verifies the uninstallation of license key 208 from device 102 by comparison of: (1) device information, e.g., device serial number 400 and platform ID 406, (2) license information, e.g., feature group 502, feature group specific data 310, and uninstall key 210, and (3) user registration information, e.g., registration ID 218, with corresponding information stored in storage device 216. If the information verifies, portal 108 generates, stores in storage device 216, and returns a new registration ID 218 to user system 106. In this manner, the user at user system 106 receives a new registration ID 218 allowing the user to proceed with install sequence 700 for another device, e.g., second network switch 110.

Figure 8:
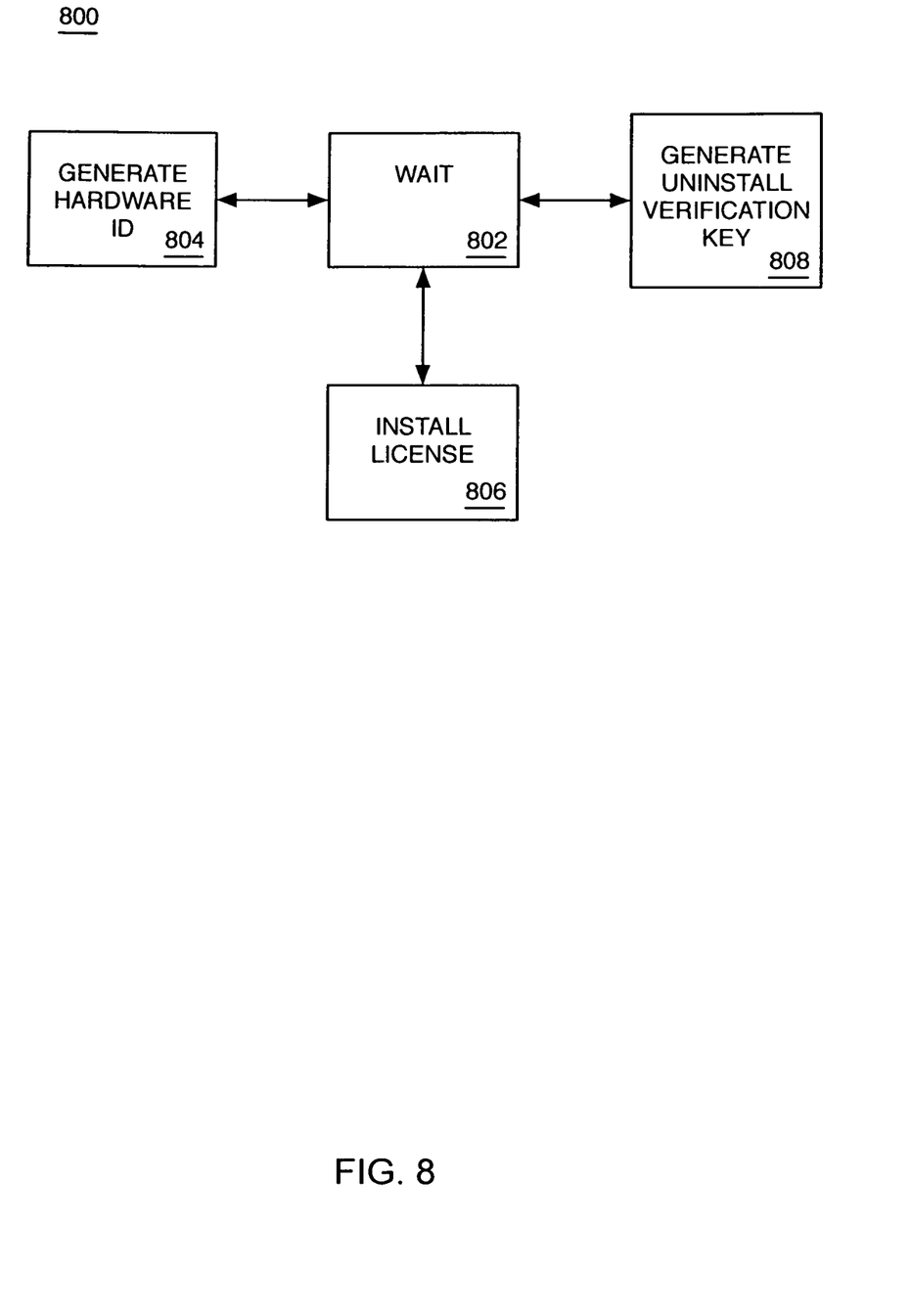
FIG. 8 is a process flow diagram of a device according to an embodiment.

FIG. 8 depicts a process flow diagram of a high level process flow 800 of an embodiment of device 102. Specifically, process flow 800 begins at block 802 wherein device 102 is in a wait state, e.g., operating without one or more feature sets enabled. After receipt of a request for hardware ID 206 (block 706 of FIG. 7), the flow proceeds to block 804 and device generates the hardware ID (block 708 of FIG. 7). After generation of hardware ID 206, device provides the hardware ID and the process flow proceeds to return to block 802.

After receipt of a request to install a license key 208 (block 714 of FIG. 7), the flow proceeds to block 806 and device 102 installs the license key as described above. After license key 208 is installed, device 102 generates an indicator of successful installation (block 716 of FIG. 7) and the process flow proceeds to return to block 802.

After receipt of a request to uninstall license key 208 (block 718 of FIG. 7), the flow proceeds to block 808 and device 102 uninstalls the license key and generates uninstall verification key 220. After generation of uninstall verification key 220, device transmits the uninstall verification key (block 720 of FIG. 7) and the process flow proceeds to return to block 802.

Figure 9:
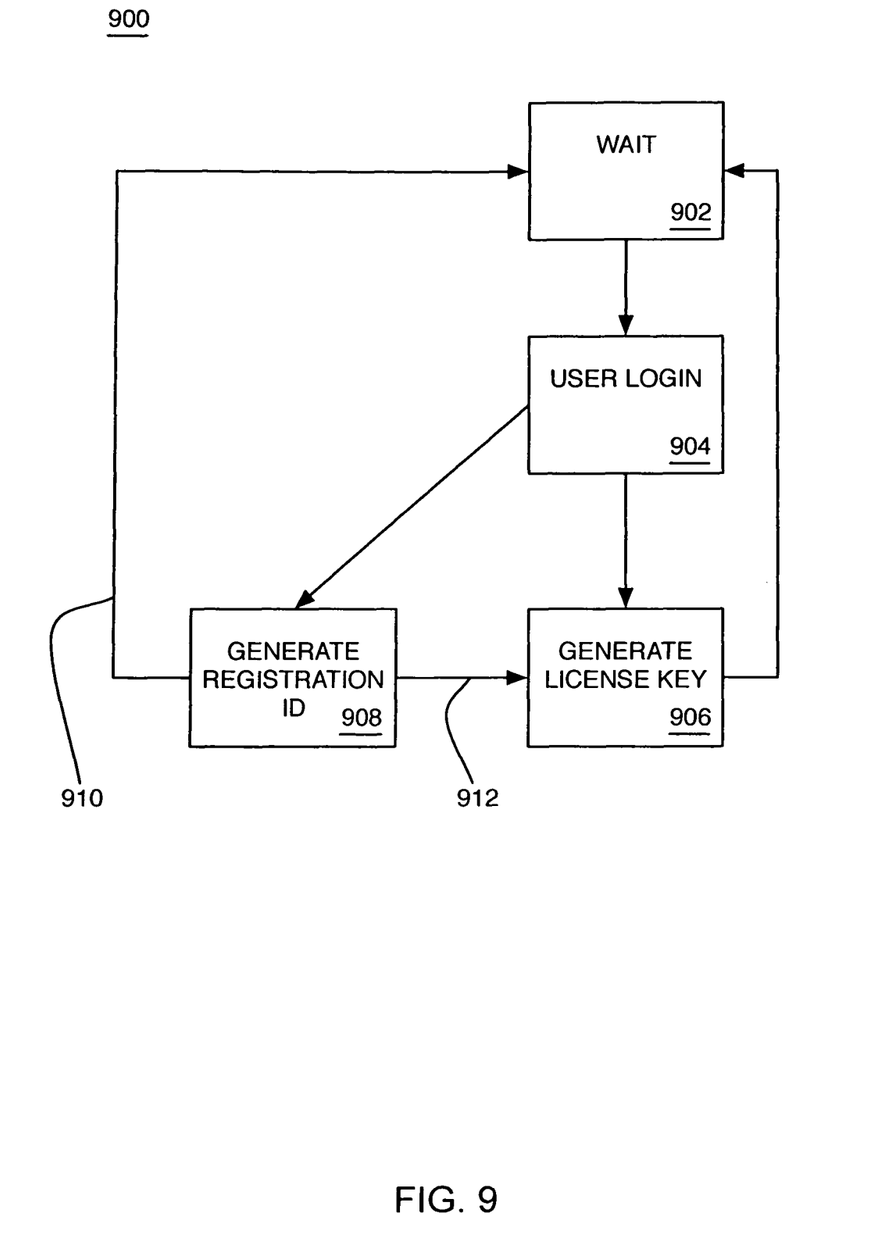
FIG. 9 is a process flow diagram of a portal according to an embodiment.

FIG. 9 depicts a process flow diagram of a high level process flow 900 according to an embodiment of portal 108. Specifically, process flow 900 begins at block 902 wherein portal 108 is in a wait-state. After receipt of a user login request (block 702 of FIG. 7), the flow proceeds to block 904 and portal 108 processes the user login. After receipt of registration ID 218 and hardware ID 206, the process flow proceeds to block 906 and portal 108 generates license key 208 and returns the license key to the user (block 712 of FIG. 7). The process flow proceeds to return to block 902.

Returning to block 904, if portal 108 receives a request to uninstall a license from a device (block 724) of FIG. 7), the process flow proceeds to block 908 and the portal generates a new registration ID 218 (block 726 of FIG. 7). If the user decides not to use the newly generated registration ID 218, and disconnects from portal 108, the flow proceeds to return to block 902 via path 910. In some embodiments, the process flow proceeds along path 910 after a predetermined time period and/or based on one or more other operational parameters. Alternatively, if the user decides to use the newly generated registration ID 218 and provides a hardware ID 206, the process flow proceeds to block 906 and continues as described above.

Thus, an embodiment enabling a transferable license between devices is described. The user is able to obtain and install a license on a first device and subsequently uninstall the license from the first device and install the license on a second device.

In some embodiments, character strings used during the licensing process, e.g., registration ID 218, hardware ID 206, license key 208, and the uninstall verification key, are constructed using base-24 encoding and using a character set including B, C, D, F, G, H, J, K, M, P, Q, R, T, V, W, X, Y, 2, 3, 4, 6, 7, 8, and 9. In further embodiments, the strings and the processing thereof is case-insensitive.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system, comprising:
   a processor
   a memory, the memory having embodied therein computer-readable program code, which when executed by a computer, causes the computer to perform operations comprising: receiving a first license key request that comprises a first unique hardware identifier associated with a first device,
   in response to receipt of the first license key request, generating a first transferable license key comprising the first unique hardware identifier, information specific to one or more license features of the first device, and a first uninstall key, receiving a second license key request that is associated with the first uninstall key and comprises a second unique hardware identifier associated with a second device,
   in response to receipt of the second license key request, verifying the second license key request based on the first uninstall key, and
   in response to a successful verification of the second license key request, generating a second transferable license key comprising the second unique hardware identifier, information specific to one or more licensed features of the second device, and a second uninstall key, and storing the first and second unique hardware identifiers and the first and second uninstall keys in the memory.

2. A system, according to claim 1, further comprising:
   an interface portal operable to: (a) receive the first and second license key requests and (b) transmit the first and second transferable license keys.

3. A system according to claim 2, wherein based at least in part on the execution of the instructions, the processor is operable to perform operations comprising generating the first and second transferable license keys such that the first and second transferable license keys respectively comprise platform identifiers of the first and second devices on which the first and second transferable license keys respectively will be installed.

4. A system according to claim 1, wherein each of the first and second license key requests comprises a respective registration identifier that includes a feature set identifier and a platform group identifier, the feature set identifier identifies one or more features able to be enabled by the registration identifier, and the platform group identifier identifies a group of one or more devices on which the first and second transferable license keys are installable; and based at least in part on the execution the instructions, the processor is operable to perform operations comprising respectively generating the first and second transferable license keys based on respective receipt of the first and second license key requests.

5. A system according to claim 4, wherein each of the first and second hardware identifiers comprises a respective feature set identifier, and the processor is operable to respectively generate each of the first and second transferable license keys in response to determinations that the respective feature set identifiers or the first and second hardware identifiers match the feature set identifiers of the respective registration identifiers.

6. A system according to claim 4, wherein the each of the first and second hardware identifiers comprises a respective platform identifier and, based at least in part on the execution of the instructions, the processor is operable to perform operations comprising respectively generating each of the first and second transferable license keys in response to determinations that the platform identifiers of the first and second hardware identifiers match the platform group identifiers of the respective registration identifiers.

7. A system according to claim 4, wherein based at least in part on the execution of the instructions, the processor is operable to perform operations comprising determining whether the respective registration identifiers match unused registration identifiers, and generating each of the first and second transferable license keys in response to determinations that the respective registration identifiers match unused registration identifiers.

8. A system according to claim 1, wherein each of the first and second hardware identifiers comprises a respective device-specific identifier, a respective device-type identifier, and a respective feature set identifier and, based at least in part on the execution of the instructions, the processor is operable to perform operations comprising encoding the respective device-specific identifier, the respective device-type identifier, and the respective feature set identifier into the first and second transferable license keys.

9. A system according to claim 1, wherein based at least in part on the execution of the instructions, the processor is operable to perform operations comprising: receiving an uninstall verification key; and in response to receipt of the uninstall verification key, generating a registration identifier based on the first uninstall key.

10. A method, comprising:
    receiving a first license key request that comprises a first unique hardware identifier associated with a first device;
    in response to receipt of the first license key request, generating a first transferable license key comprising the first unique hardware identifier, information specific to one or more licensed features of the first device, and a first uninstall key;
    receiving a second license key request that is associated with the first uninstall key and comprises a second unique hardware identifier associated with a second device;
    in response to receipt of a the second license key request, verifying the second license key request based on the first uninstall key; and in response to a successful verification of the second license key request, creating a second transferable license key comprising the second unique hardware identifier, information specific to one or more licensed features of the second device, and a second uninstall key;

wherein the generating, the verifying, and the creating are performed by a processor.

11. At least one non-transitory computer-readable medium having embodied therein computer-readable program code, which when executed by a computer, causes the computer to perform operations comprising:

receiving a first license key request that comprises a first unique hardware identifier associated with a first device;

in response to receipt of the first license key request, generating a first transferable license key comprising the first unique hardware identifier, information specific to one or more licensed features of the first device, and a first uninstall key;

receiving a second license key request that is associated with the first uninstall key and comprises a second unique hardware identifier associated with a second device;

in response to receipt of a the second license key request verifying the second license key request based on the first uninstall key; and in response to a successful verification of the second license key request, creating a second transferable license key comprising the second unique hardware identifier, information specific to one or more licensed features of the second device, and a second uninstall key.

* * * * *

UNITED STATES PATENT AND TRADEMARK OFFICE
CERTIFICATE OF CORRECTION

| | | |
|---|---|---|
| PATENT NO. | : 8,660,964 B2 | Page 1 of 1 |
| APPLICATION NO. | : 11/477863 | |
| DATED | : February 25, 2014 | |
| INVENTOR(S) | : Charles F. Clark et al. | |

It is certified that error appears in the above-identified patent and that said Letters Patent is hereby corrected as shown below:

In the Claims

In column 9, line 27, in Claim 1, delete "processor" and insert -- processor; --, therefor.

In column 9, lines 29-30, in Claim 1, delete "a computer," and insert -- the processor, --, therefor.

In column 9, line 30, in Claim 1, delete "computer" and insert -- processor --, therefor.

In column 9, line 53, in Claim 2, delete "system," and insert -- system --, therefor.

In column 10, line 7, in Claim 4, delete "execution the" and insert -- execution of the --, therefor.

In column 10, line 18, in Claim 5, delete "identifiers or" and insert -- identifiers of --, therefor.

In column 10, line 21, in Claim 6, after "wherein" delete "the".

In column 10, line 65, in Claim 10, delete "a the" and insert -- the --, therefor.

In column 11, line 23, in Claim 11, delete "a the" and insert -- the --, therefor.

In column 11, line 23, in Claim 11, delete "request" and insert -- request, --, therefor.

Signed and Sealed this
Seventeenth Day of June, 2014

Michelle K. Lee
*Deputy Director of the United States Patent and Trademark Office*